United States Patent
Lee et al.

(10) Patent No.: US 11,599,548 B2
(45) Date of Patent: Mar. 7, 2023

(54) UTILIZE HIGH PERFORMING TRAINED MACHINE LEARNING MODELS FOR INFORMATION RETRIEVAL IN A WEB STORE

(71) Applicant: Kohl's, Inc., Menomonee Falls, WI (US)

(72) Inventors: Alan Lee, Sunnyvale, CA (US); Ru Wang, Santa Clara, CA (US); Ritaja Sur, Sunnyvale, CA (US); Arjun Manimaran, San Jose, CA (US); Suraj Nayak Mithbail, San Jose, CA (US); Xiaoyu Jin, Milipitas, CA (US); Jinge Zhang, San Ramon, CA (US); Xiaobing Luo, Milipitas, CA (US); Zhiyu Liang, San Jose, CA (US); Milan Kumar Behera, Fremont, CA (US); Thrinath Babu Kathula, Dublin, CA (US)

(73) Assignee: Kohl's, Inc., Menomonee Falls, WI (US)

( * ) Notice: Subject to any disclaimer, the term of this patent is extended or adjusted under 35 U.S.C. 154(b) by 150 days.

(21) Appl. No.: 16/918,928

(22) Filed: Jul. 1, 2020

(65) Prior Publication Data
US 2021/0004379 A1 Jan. 7, 2021

Related U.S. Application Data

(60) Provisional application No. 62/869,376, filed on Jul. 1, 2019.

(51) Int. Cl.
*G06F 7/00* (2006.01)
*G06F 16/2457* (2019.01)
(Continued)

(52) U.S. Cl.
CPC ...... *G06F 16/24578* (2019.01); *G06F 16/248* (2019.01); *G06N 5/04* (2013.01);
(Continued)

(58) Field of Classification Search
CPC ............. G06F 16/24578; G06F 16/248; G06F 16/243; G06F 16/2425; G06F 16/90348;
(Continued)

(56) References Cited

U.S. PATENT DOCUMENTS

2012/0078825 A1* 3/2012 Kulkarni ........... G06F 16/24578
706/12
2014/0297476 A1* 10/2014 Wang .................... G06F 16/335
705/26.62

(Continued)

Primary Examiner — Mohammad A Sana
(74) Attorney, Agent, or Firm — Perkins Coie LLP

(57) ABSTRACT

The present technology is directed to high performing trained machine learning models for information retrieval in a web store. In some embodiments, for example, when a search query is received from a user of an online retailer, a computer system associated with the online retailer accesses measurements of performance of sets of search results returned in response to previous user search queries. Each of the previous search results set is a set that was ranked by a machine learning model selected from a store of machine learning models that are each trained to rank search results. Based on the measurements of performance, the computer system selects a machine learning model to rank search results for a response to the received search query. The ranked search results are provided for output to the user.

17 Claims, 6 Drawing Sheets

(51) Int. Cl.
  *G06N 20/00* (2019.01)
  *G06Q 30/0282* (2023.01)
  *G06F 16/248* (2019.01)
  *G06Q 30/0601* (2023.01)
  *G06N 5/04* (2023.01)

(52) U.S. Cl.
  CPC ......... *G06N 20/00* (2019.01); *G06Q 30/0282* (2013.01); *G06Q 30/0625* (2013.01)

(58) Field of Classification Search
  CPC .... G06F 16/90324; G06N 20/00; G06N 5/04; G06N 20/20; G06N 5/003; G06N 7/005; G06Q 30/0282; G06Q 30/0625
  See application file for complete search history.

(56) References Cited

U.S. PATENT DOCUMENTS

2019/0391983 A1* 12/2019 Jiang ................. G06N 20/00
2020/0341987 A1* 10/2020 Wright ............... G06N 20/00

* cited by examiner

UTILIZE HIGH PERFORMING TRAINED MACHINE LEARNING MODELS FOR INFORMATION RETRIEVAL IN A WEB STORE

CROSS-REFERENCE TO RELATED APPLICATION

This application claims the benefit of U.S. Provisional Patent Application No. 62/869,376, filed Jul. 1, 2019, which is incorporated herein by reference in its entirety.

BACKGROUND

Online retailers often providing searching capabilities through their web stores for their customers to search for products or offerings available through the store. These search capabilities can include both basic search functionality—where, for example, the web store processes a query received from the user to identify any products that match the query—as well as boosting rules that support the basic search. An example of a boosting rule that may be used by an online retailer is promotion of certain brands for certain demographics of users. Other common techniques used by search systems include using deep learning model to add context aware results for the search queries, and using a ranking function to generate a score for each document in the data store and sort to generate a ranking that determines which products are output as search results for a given user query and how the search results are arranged. As more features are input to search result scoring and ranking functions, these ranking functions also become more complex. Machine learning models have been introduced to learn the parameters within a ranking function. However, existing search systems are typically limited to a single trained machine learning model and do not provide the flexibility to have multiple trained machine learning models operating in parallel in a search system.

DETAILED DESCRIPTION

Figure 1:
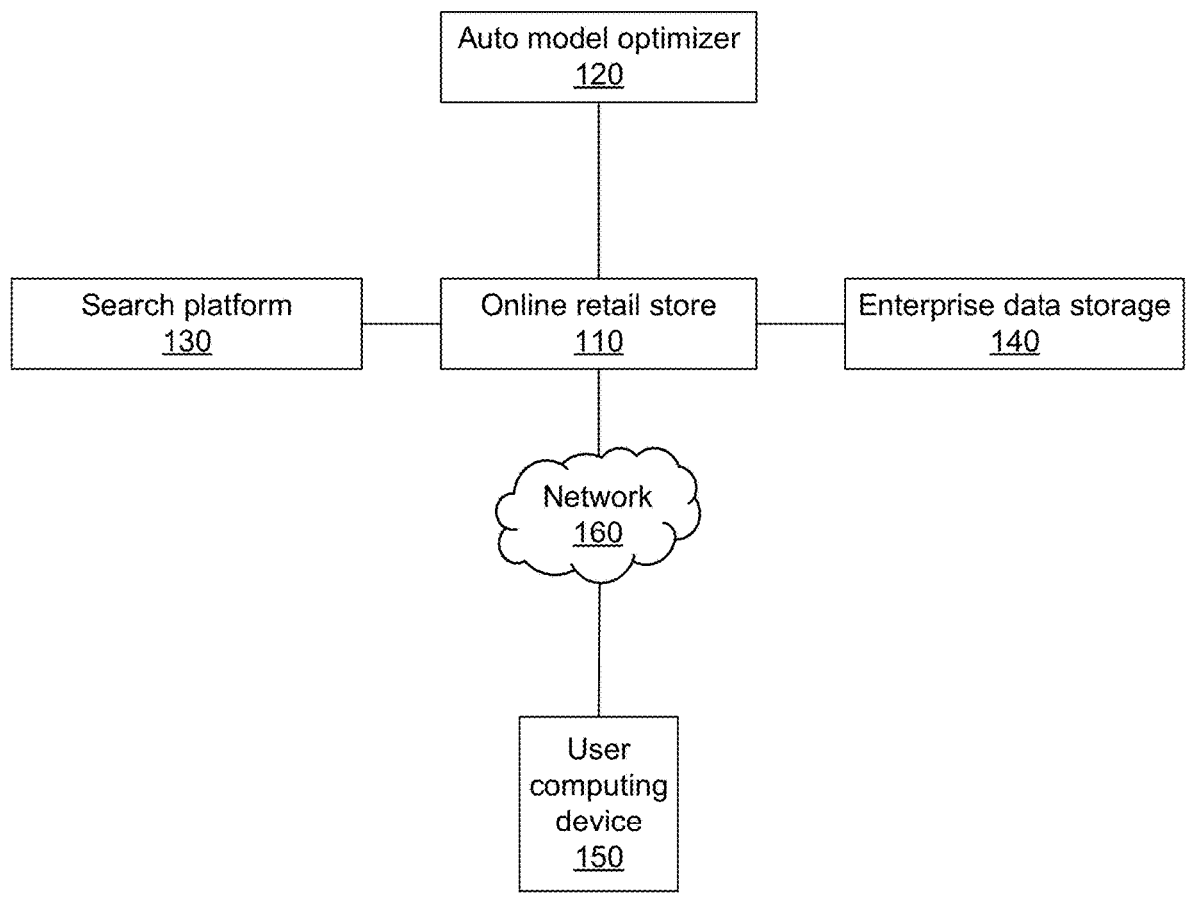
FIG. 1 is a block diagram illustrating a computing environment in which an online retail store operates in accordance with embodiments of the present technology.

Embodiments described herein generate rankings of search results that are returned to a user who inputs a search query for products in an online system. The ranking systems and methods described herein provide the ability for the online system to use multiple trained models simultaneously for different queries input at the online system, measuring performance of each and using the measured performances to select models that are more likely to provide relevant search results. Embodiments are described herein with reference to the particular example of returning search results for products sold through an online retailer. However, the functionality described herein can be implemented for any of a variety of online systems through which users may search for items or services. For example, embodiments can be implemented to rank search results for listings in hotel booking or vacation rental services, or for media content items offered through a media distribution platform.

In some implementations, a process for ranking search results includes receiving a search query from a user of an online retailer at a computer system associated with the online retailer. The computer system accesses measurements of performance of sets of search results returned in response to previous user search queries. Each of the previous search results set is a set that was ranked by a machine learning model selected from a store of machine learning models that are each trained to rank search results. Based on the measurements of performance, the computer system selects a machine learning model to rank search results for a response to the received search query. The ranked search results are provided for output to the user, for example via a search results webpage.

In some implementations, a process for ranking search results includes accessing a store including multiple machine learning models that are each trained to generate a ranking of search results in response to search queries received at an online retailer. For each of a plurality of search queries, a computer system associated with the online retailer applies one of the machine learning models selected from the store to generate a ranking of search results that match the query. The ranked search results are returned for output to a user who input the search query. A performance of the returned search results is measured. The computer system receives a subsequent search query from a user of the online retailer. Responsive to receiving the subsequent search query, the computer system selects one of the machine learning models based on the measured performance of the returned search results. Search results ranked using the selected machine learning model are returned for output to the subsequent user.

Some implementations of a system for ranking search results include a trained machine learning model storage, a performance monitoring system, a decision engine, and a search platform. The trained machine learning model storage comprises a non-transitory computer readable storage medium and stores multiple machine learning models that are each trained to generate a ranking of search results in response to search queries received at an online retailer. The performance monitoring system includes a processor that is configured to, for each of a plurality of search queries input at the online retailer, apply one of the machine learning models selected from the store to generate a ranking of search results that match the received search query. The ranked search results are returned for output to the user, and the performance monitoring system measures a performance of the returned search results. The decision engine includes a processor configured to select, for a given search query received at the online retailer, one of the machine learning models based on measured performance of previously returned search results. Finally, the search platform includes a processor that is configured to process the search queries input at the online retailer to identify sets of products that match each of the search queries. For each of the processed search queries, the search platform applies a machine learning model selected by the decision engine to rank the identified set of products that match the processed search query. The ranked set of products is provided for output to the user who submitted the query.

System Overview

FIG. 1 is a block diagram illustrating an example of a computing environment in which an online retail store operates. As illustrated in FIG. 1, the environment can include an enterprise web store 110, an auto model optimizer 120, a search platform 130, and an enterprise data storage 140, and the online retail store 110 can communicate with a user computing device 150 over a network 160. Other embodiments of search result generation and ranking can be implemented using additional, fewer, or different components, or with functionality distributed differently between the components. For example, in some implementations, the online retail store 110, search platform 130, and/or auto model optimizer 120 can be implemented within the same system.

The online retail store 110 is a store accessible to customers over the network 160, which in some implementations is the Internet. The retail store 110 can include or can be communicatively coupled to a product database that stores information about products available for purchase through the store. The retail store 110 can further include a website that can be accessed and viewed by a customer using the user computing device 150. For example, a customer can access the website to view the product information stored in the product database and to purchase desired items. The products sold through the website can include, for example, physical goods that are shipped to the purchasing customer, electronic files available for download, or online services that can be accessed upon purchase.

The search platform 130 facilitates user search of the online retail store 110. Examples of search platform capabilities include, but are not limited to, search request and response services, distributed indexing, and load balanced querying. For example, when a user submits a search query to the online retail store 110, the search platform 130 processes the query to identify products in the product database that match the query. The search platform 130 ranks the search results and returns the ranked results for output to the user. Some implementations of a search platform may use existing systems such as Apache Solr, while other implementations may be custom-built for the particular online retail store 110.

The enterprise data storage 140 stores data associated with the online retail store 110. For example, the enterprise data storage 140 may maintain the product database of the online retail store 110. The data storage 140 can also store information generated during search query processing, such as measured performance of each ranking algorithm.

The auto model optimizer 120 measures and analyzes performance of multiple ranking algorithms. Based at least in part on the performance, the auto model optimizer 120 selects a ranking algorithm for the search platform 130 to apply when returning search results in response to a user search query. The auto model optimizer 120 is described further with respect to FIG. 3.

A user accesses the website associated with the online retail store 110 to submit search queries, view the store's products, and purchase products using the user computing device 150. The user computing device 150 can be any device capable of communicating with the online retail store 110 and displaying pages of the website associated with the retail store. For example, the user computing device 150 can include any personal computer, laptop computer, mobile phone, smart television, or gaming console.

Figure 2:
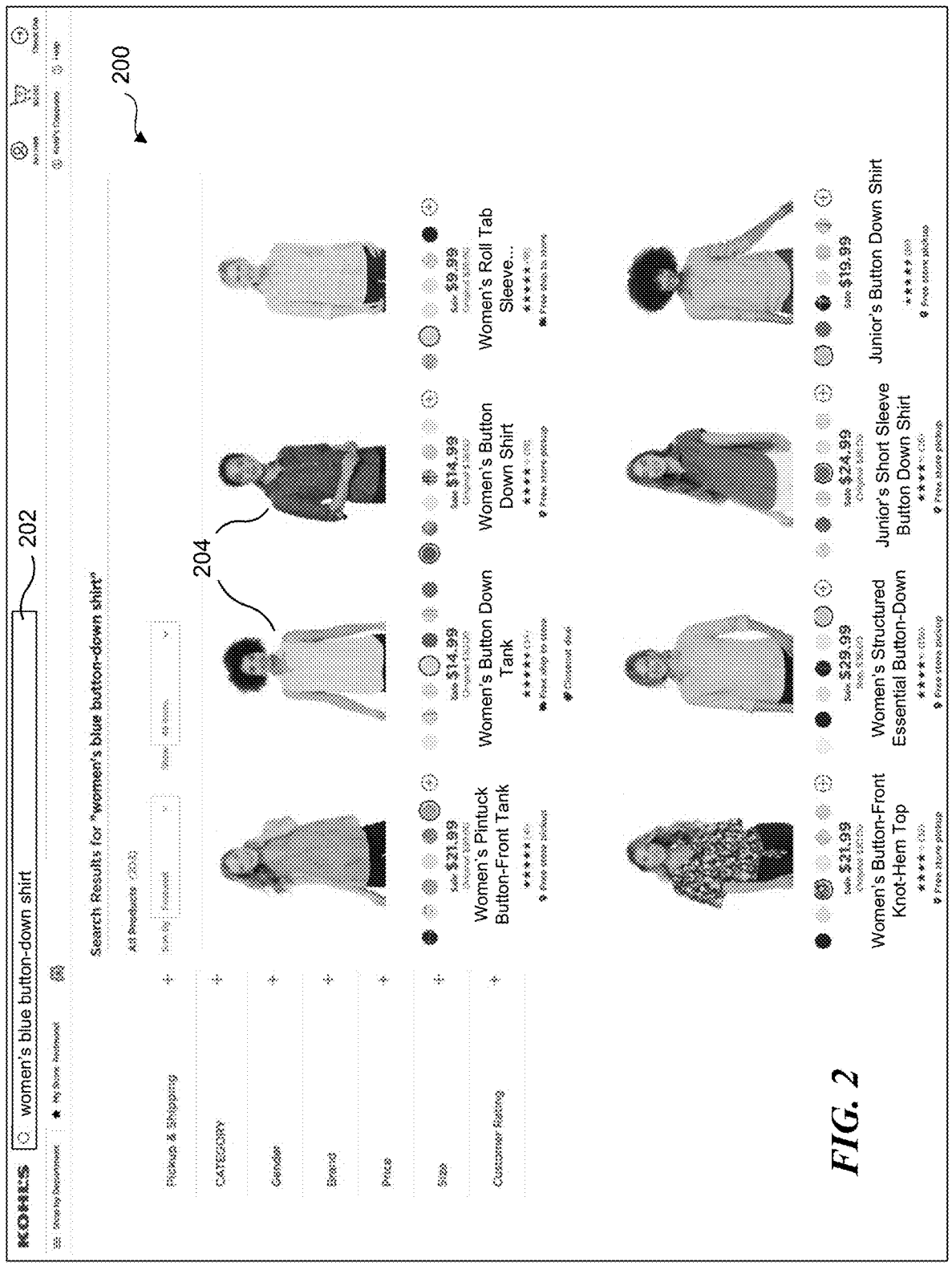
FIG. 2 illustrates an example search results webpage associated with an online retail store configured in accordance with embodiments of the present technology.

FIG. 2 illustrates an example search results webpage 200 associated with the online retail store 110. The search results page 200 is generated when a user submits a search query through the retailer's website. For example, the webpage 200 was generated after a user entered a search query for "women's blue button-down shirt" in a search bar 202. When the query was submitted, the search platform 130 processed the query and identified products in the retailer's product database that matched the query. The matching products were then ranked and provided to the user via the search results webpage 200 as a set of search results 204 that are presented in the ranked order. If the user sees a product of interest among the search results 204, the user can select (e.g., click on) the result 204 to navigate to a webpage with more information describing the product. In various implementations, the user can add the product to a shopping cart to purchase the item from the product information page, the search results page 200, or both. Furthermore, in some cases, the user can provide a rating through the search results page 200 that indicates whether the search results were relevant to the user. For example, the rating can indicate whether the search results included the type of product for which the user was searching.

Figure 3:
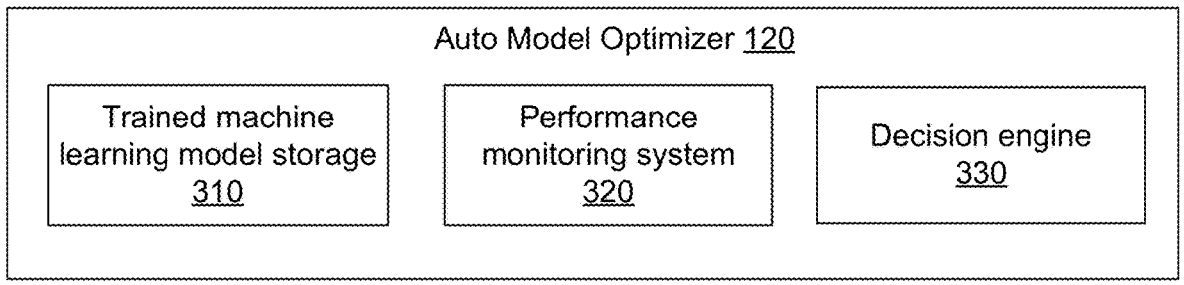
FIG. 3 is a block diagram illustrating example components of an auto model optimizer configured in accordance with embodiments of the present technology.

FIG. 3 is a block diagram illustrating components of the auto model optimizer 120, according to some embodiments. As shown in FIG. 3, the auto model optimizer 120 can include a trained machine learning model storage 310, a performance monitoring system 320, and a decision engine 330.

The trained machine learning model storage 310 comprises a computer readable storage medium to store the trained machine learning models. The models can include any of variety of learning to rank (LTR) or machine learned ranking (MLR) algorithms, and can be trained using, for example, supervised learning methods, semi-supervised learning methods, or reinforcement learning methods. The storage 310 can also store metadata associated with each model, as well as measurements of the models' historical performance. For example, the computer readable storage medium stores parameters of probability distributions (such as fit parameters specifying the shape of the probability distributions).

The performance monitoring system 320 comprises a software system with mathematical functions and algorithms to convert captured performance parameters into one or more performance monitoring values (e.g., floating point figures). For example, for click through rate, the performance monitoring system 320 can monitor click events on the search results pages. When a customer clicks one or more products, the monitoring system counts as 1 (a click); otherwise the product is scored as 0 (no click). The performance monitoring system 320 calculates the click through rate over multiple search pages.

The decision engine 330 includes mathematical formulas and algorithms to determine probabilities associated with each machine learning model's performance and the resulting opportunities that are to be assigned to each model to rank search results. The decision engine 330 can also execute scaling mechanisms to enable exploration of the available machine learning models.

Measuring Performance of Machine Learning Models

Figure 4:
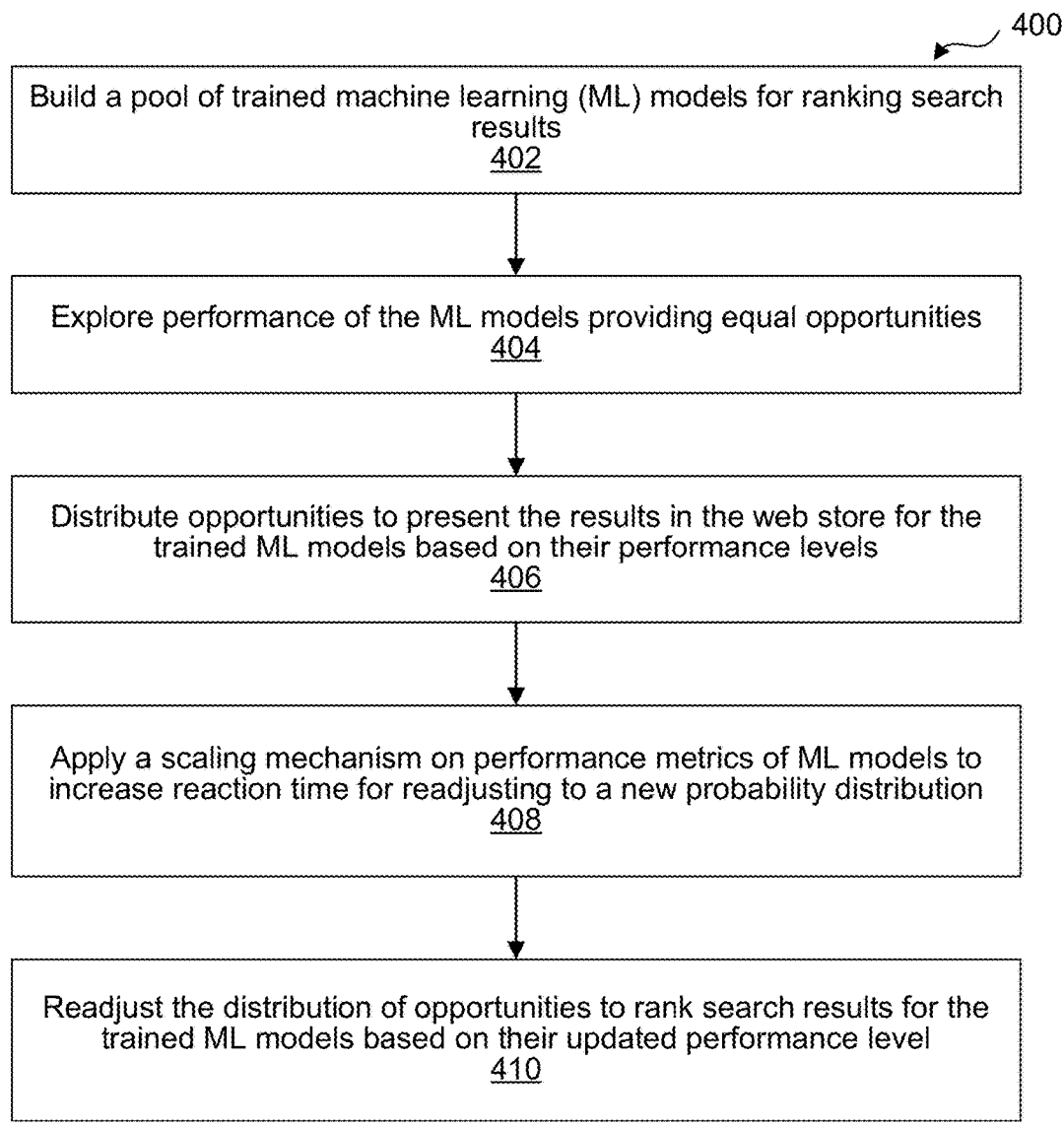
FIG. 4 is a flowchart illustrating a process for measuring and analyzing performance of a set of trained machine learning models for ranking search results in accordance with embodiments of the present technology.

FIG. 4 is a flowchart illustrating a process 400 for measuring and analyzing performance of a set of trained machine learning models for ranking search results, according to some implementations. The process shown in FIG. 4 can be performed by the auto model optimizer 120. Other implementations of the process 400 can include additional, fewer, or different steps, and the steps can be performed in different orders.

As shown in FIG. 4, the auto model optimizer 120 builds a pool of trained machine learning models for ranking search results at block 402. Each model in the set is trained to rank search results, but the set can include models that implement different algorithms or are trained using different training data. Accordingly, some models may generate search results rankings that are more relevant to a given user search query than other models.

At block 404, the auto model optimizer 120 explores performance of the machine learning models in the pool. During the exploration phase, the auto model optimizer 120 can identify each model in the pool to rank search results for different user queries received at the online retail store 110. For example, as user queries are received, the search platform 130 sends requests to the auto model optimizer 120 for a model to rank the results for each search. The auto model optimizer 120 selects a model for each search and sends an identifier of the selected model to the search platform 130 to apply.

The auto model optimizer 120 can give the machine learning models in the pool approximately equal opportunities in which performance is measured. The auto model optimizer 120 can use any of a variety of variables to determine whether the models are afforded equal opportunities. For example, each model can be used to rank approximately equivalent numbers of search results, to rank results for searches submitted by approximately equivalent types of users or queries, or for an approximately equivalent number of user sessions on the website regardless of the number of queries the user submitted during the session. The auto model optimizer 120 tracks a rate at which each model is applied according to the selected variable to ensure that each model is afforded approximately equal opportunities. For example, if the auto model optimizer 120 targets using each model for an equivalent number of search queries, the auto model optimizer 120 counts the number of queries for which each model's rankings were output. When a new search query is received, the auto model optimizer 120 identifies a model that has been used less frequently than other models, and uses the identified model to rank the search results returned for the query. Each model's count can be initiated using default settings on approximately equal distributions to help ensure equal opportunities.

As the machine learning models are selected and used to rank search results, the auto model optimizer 120 captures metrics that are indicative of performance of each model. Example metrics include click-through rate of the search results (e.g., whether the user clicked on any provided search results, and a rank of the search result that was selected), user reviews related to the search results, or interleaving techniques. Interleaving is a technique for evaluating information retrieval systems based on implicit user feedback (such as click or dwell time). The interleaving technique can include a mixing policy and a credit assignment rule. The mixing policy determines how two or more ranking functions are combined to produce an interleaved ranking and can be implemented, for example, as balanced interleaving, team-draft interleaving, or probabilistic interleaving. The credit assignment rule takes user implicit feedback and generates a score that indicates the degree of preference for one ranking functions over the other. For example, a rule used in team-draft interleaving counts a number of clicks in each ranking function (e.g., a number of times a user clicked on one of the ranked search results), and the ranking function with more clicks "wins." If the number of clicks is equal, the ranking functions tie. Clicks can be weighted equally, or clicks associated with search results at different positions in the ranking can be weighted differently than one another. For example, some team-draft interleaving rules may assign a higher weight to clicks on search results that are higher in the ranking than those that are lower.

At block 406, the auto model optimizer 120 distributes opportunities to rank search results for the machine learning models based on their respective performance levels. The performances measured during the exploration phase at block 404 can be used to generate probability distributions for each model that represents probabilities that the rankings generated by the model will achieve a particular performance criterion (such as a specified click-through rate or a specified user rating). These probability distributions can be, for example, Gaussian distributions, normal distributions, t-distributions, or Poisson distributions. When a search result is received at the online retail store's website, the auto model optimizer 120 can select a model to rank the corresponding search results. In some implementations, the model is selected using a dynamic method that takes into account parameters such as processing capacity of the search platform 130, storage capacity of the search platform 130, network availability, identity of the online retail store or page of the store's website (e.g., important stores or pages use a certain pool of models, less important stores or pages use a different pool), search terms received to perform the search, browser used to perform the search, location of user who is performing the search, categories of search terms, channel used to perform the search, or any other contextual information of users or queries. The dynamic method can additionally or alternatively use a multi-armed bandit approach, in which the auto model optimizer 120 uses the probability distributions associated with model performance to select a model that has a highest probability of success according to a specified performance criterion. In other implementations, the model is selected using a predefined method, in which rules specified by a user or a computer system are executed to select the model.

At block 408, the auto model optimizer 120 applies a scaling mechanism on the performance metrics captured for each machine learning model to increase a reaction time for model selection. The scaling mechanism can be performed periodically or in response to a triggering condition. For example, the scaling cycle is triggered if the auto model optimizer 120 detects that a difference between mean value of expected performance of two or more explored machine learning models exceeds a threshold difference, indicating that exploration of non-winning models has stopped. In general, for each of multiple machine learning models, the scaling mechanism can artificially increase a variance in the model's calculated probability of achieving a particular performance criterion. The higher variance forces the auto model optimizer 120 to explore other models to determine if the other models achieve better performance than a model the system is exploiting prior to the scaling cycle.

When a scaling mechanism is triggered, the auto model optimizer 120 applies a scaling value to at least one parameter of the probability distribution to scale the parameter. Scaling the parameter can effectively generate a new probability distribution that, for example, has the same mean value as the unscaled distribution but a higher variance. The scaling value can be selected according to a bounded scale mechanism or a geometric scale mechanism. To implement a bounded scale mechanism, the auto model optimizer 120 can use a mathematical formula to verify whether numerical parameters of the probability distribution of each machine learning model's performance exceed a selected or configurable upper bound. If the upper bound is exceeded, the auto model optimizer 120 adjusts the numerical parameters of the probability distribution corresponding to each model to fall below the upper bound. The auto model optimizer 120 can adjust the parameters by subtracting a specified value from each parameter or multiplying the parameters by a scaling factor that will reduce the value of the parameters. The scaling of the distribution's parameters results in a higher variance of the distribution and a lower confidence in the distribution's mean. This increased variance, in turn, causes the auto model optimizer 120 to explore performance of different machine learning models.

In some implementations, the auto model optimizer 120 automatically selects the upper bound for the bounded scale mechanism using iteratively conducted offline tests to select a value that ensures a desired percentage of exploration. Furthermore, several upper bound values can be used in the online setting and exploration and consequently the rewards can be observed. The value of the upper bound can be selected based on the observed model performances. For example, the auto model optimizer 120 can select the value that achieves the highest overall performance, or a value that achieves a performance metric that is greater than a specified threshold. Other implementations of the auto model optimizer 120 determine the upper bound parameters automatically based on feedback from user behavior to ensure exploration of other models.

If the auto model optimizer 120 instead selects a geometric scaling mechanism, the auto model optimizer 120 uses a scaling constant value to scale numerical parameters of the probability distribution corresponding to each machine learning model. The scaling constant value can be a configurable parameter of the auto model optimizer 120. The scaling constant value can be selected based on offline evaluation to achieve a specified percentage of exploration, or based on online evaluation to increase rewards. When the parameters of the probability distribution are scaled using the scaling constant value, the auto model optimizer 120 increases variance of the probability distributions and therefore increases exploration of other machine learning models.

As an example, the scaling constant value is a common ratio parameter for a geometric sequence that scales down the parameters of the probability distribution based on a geometric sequence. In some implementations, the scaling constant value is applied at each scaling cycle by multiplying the parameter at the previous cycle by the scaling constant value to generate a new parameter for the probability distribution. In other implementations, the parameter is reset at each scaling cycle or a subset of the scaling cycles before being multiplied by the scaling constant value.

After applying the scaling mechanism, the auto model optimizer 120 continues to select machine learning models to rank search results based on the scaled probability distributions and measure the models' performance. At block 410, the auto model optimizer 120 readjusts the probability distributions associated with the models based on their updated performance levels. An amount of time between readjustment cycles can be a predefined interval. Alternatively, the auto model optimizer 120 can readjust the probability distributions in response to a triggering condition, such as detecting that an average performance of a model for a specified period of time (e.g., the last hour) differs from an expected average performance of the model by a threshold amount. Furthermore, in some cases, the performance of a given machine learning model falling below a specified threshold can trigger the auto model optimizer 120 to retrain the model.

Ranking Search Results Using Machine Learning Models

Figure 5:
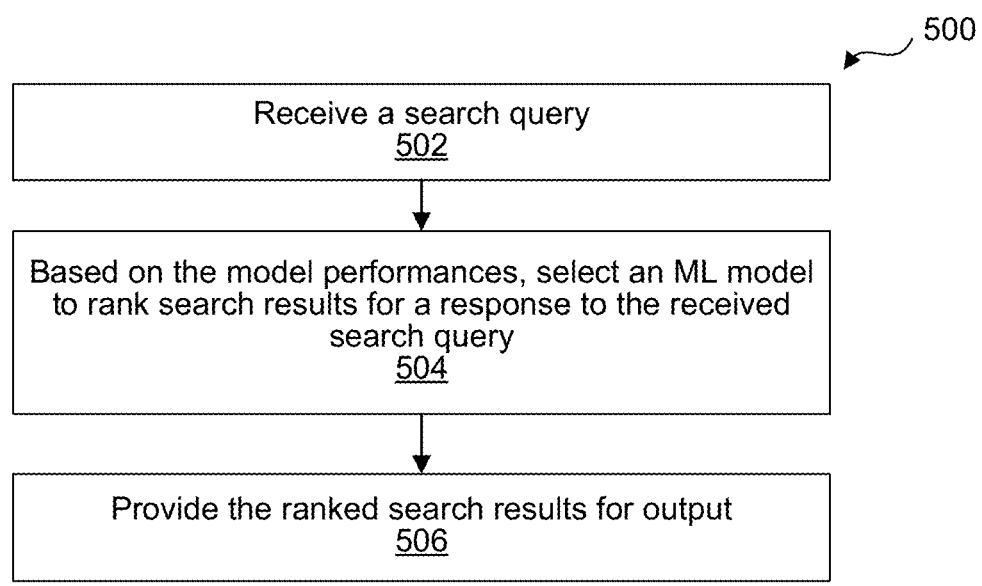
FIG. 5 is a flowchart illustrating a process for applying machine learning models to rank search results in accordance with embodiments of the present technology.

FIG. 5 is a flowchart illustrating a process 500 for applying machine learning models to rank search results. The process 500 can be performed by the search platform 130 in some implementations. Other implementations of the process 500 can include additional, fewer, or different steps, and the steps can be performed in different orders.

At block 502 in FIG. 5, the search platform 130 receives a search query from a user of the online retail store 110. The search query can include a string of terms or a natural language query that can be processed to identify matching products from the online retailer's product database.

At block 504, the search platform 130 selects a machine learning model from a store of machine learning models that are each trained to rank search results. The model can be selected based on measurements of the performance of each model, captured as metrics associated with the search results ranked by the models for previously submitted user search queries. For example, the search platform 130 uses the measured performances to select a model that has a highest probability of achieving a specified performance criterion. Alternatively, the search platform 130 can receive an identifier of a machine learning model selected by the auto model optimizer 120.

The search platform 130 applies the selected machine learning model to rank search results for a response to the user query. At block 506, the search platform 130 provides the ranked results for output to the user. The ranked results can be output, for example, by a search results webpage displayed by the user computing device 150.

Example Computer Systems

Figure 6:
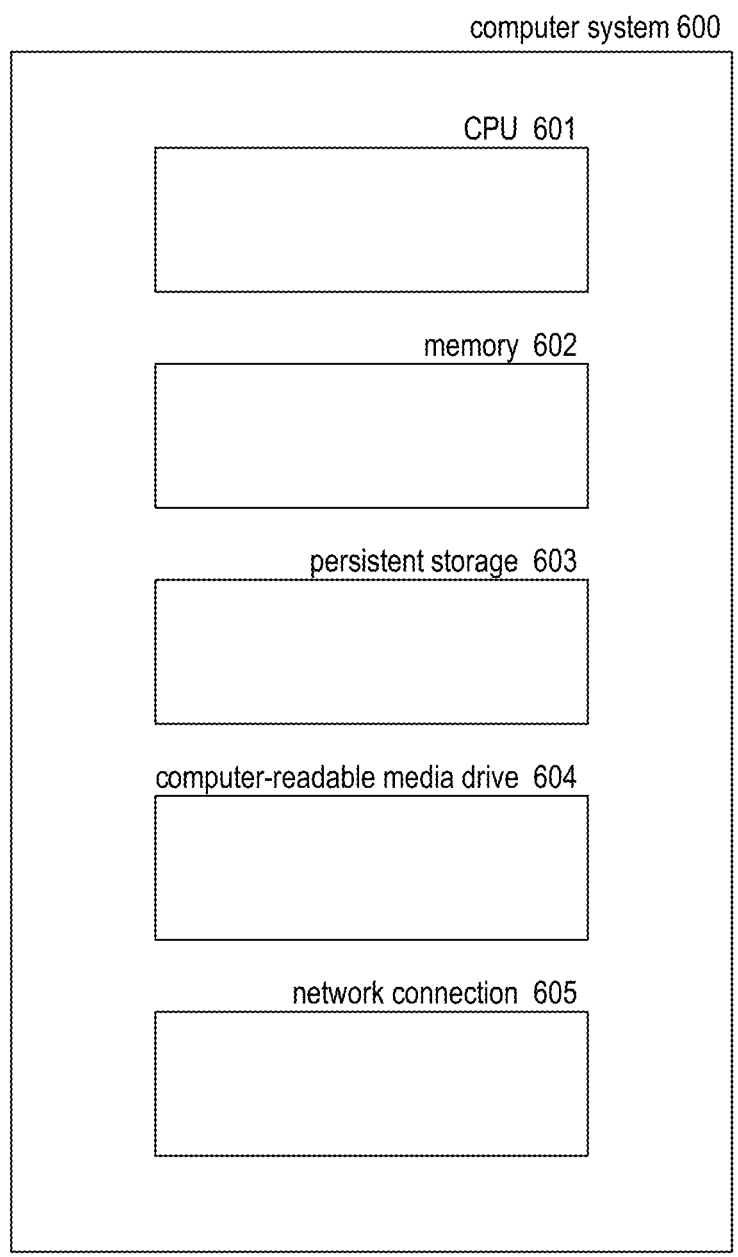
FIG. 6 is a block diagram showing some of the components typically incorporated in at least some of the computer systems and other devices on which the sentiment analysis system operates in accordance with embodiments of the present technology.

FIG. 6 is a block diagram showing some of the components typically incorporated in at least some of the computer systems and other devices on which the web results optimization system operates. In various embodiments, these computer systems and other devices 600 can include server computer systems, desktop computer systems, laptop computer systems, netbooks, mobile phones, personal digital assistants, televisions, cameras, automobile computers, electronic media players, etc. In various embodiments, the computer systems and devices include zero or more of each of the following: a central processing unit ("CPU") 601 for executing computer programs; a computer memory 602 for storing programs and data while they are being used, including the web results optimization system and associated data, an operating system including a kernel, and device drivers; a persistent storage device 603, such as a hard drive or flash drive for persistently storing programs and data; a computer-readable media drive 604 that are tangible storage means that do not include a transitory, propagating signal, such as a floppy, CD-ROM, or DVD drive, for reading programs and data stored on a computer-readable medium; and a network connection 605 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the web results optimization system can be implemented using devices of various types and configurations, and having various components.

Figure 7:
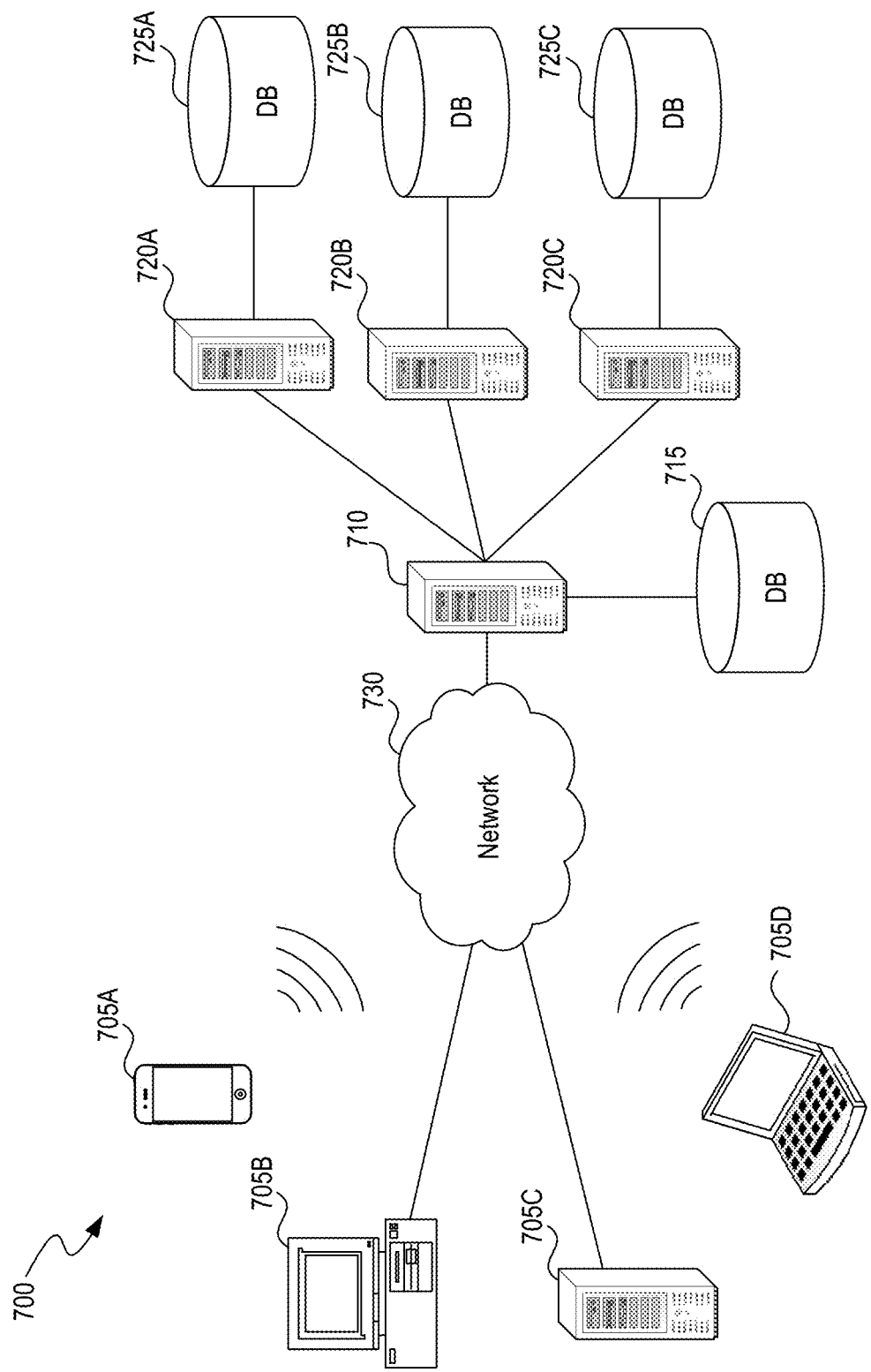
FIG. 7 is a system diagram illustrating an example of a computing environment in which the sentiment analysis system operates in some embodiments configured in accordance with the present technology.

FIG. 7 is a system diagram illustrating an example of a computing environment in which the web results optimization system operates in some embodiments. In some implementations, environment 700 includes one or more client computing devices 705A-D, examples of which can include computer system 100. Client computing devices 705 operate in a networked environment using logical connections 710 through network 730 to one or more remote computers, such as a server computing device.

In some implementations, server 710 is an edge server which receives client requests and coordinates fulfillment of those requests through other servers, such as servers 720A-C. In some implementations, server computing devices 710 and 720 comprise computing systems, such as computer system 100. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server/client devices. In some implementations, servers (610, 720A-C) connect to a corresponding database (615, 725A-C). As discussed above, each server 720 can correspond to a group of servers, and each of these servers can share a database or can have its own database. Databases 715 and 725 warehouse (e.g., store) information such as user data (e.g., user identifiers, user profiles, etc.), web page data, machine learning models, performance parameters, and so on. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. In some implementations, network 730 is the Internet or some other public or private network. Client computing devices 705 are connected to network 730 through a network interface, such as by wired or wireless communication. While the connections between server 710 and servers 720 are shown as separate connections, these connections can be any kind of local, wide area, wired, or wireless network, including network 730 or a separate public or private network.

Embodiments of systems and methods described herein cause machine learning models that are performing at or above a certain performance threshold to automatically be assigned higher probabilities to re-rank search results. If a given machine learning model does not generate a ranking of search results that is useful to a user, the model's observed performance over time will be lower than that of more effective machine learning models. As performance decreases, the probability that the model will be selected to rank search results in response to user search queries will decrease correspondingly. Models with high performance, in contrast, will have a higher probability of being selected for use. Furthermore, the scaling mechanism described herein enables the system to react to changes in user behavior by adjusting the probabilities of selecting each machine learning model. Thus, the ranked search results generated by the web store are more likely to be useful to the store's users than search results generated by a single machine learning model or less adaptive search result ranking methodologies.

We claim:

1. A method comprising:
receiving at a computer system associated with an online retailer, a search query from a user of the online retailer;
accessing by the computer system, measurements of performance of sets of search results returned in response to previous user search queries submitted at the online retailer, each set of search results ranked by a machine learning model selected from a store of machine learning models that are each trained to rank search results;
selecting by the computer system, based on the measurements of performance, a machine learning model to rank search results for a response to the received search query;
providing the ranked search results for output to the user;
detecting, by the computer system, a triggering condition for a scaling cycle;
responsive to detecting the triggering condition, applying, by the computer system, a scaling mechanism to increase an exploration of additional machine learning models selected from the store;
receiving, at the computer system, a subsequent search query; and
selecting, by the computer system, a different machine learning model from the store based on the exploration to rank search results for a response to the subsequent search query.

2. The method of claim 1, further comprising measuring the performance of the sets of search results, wherein measuring the performance comprises, for each of the previous user search queries:
applying one of the machine learning models selected from the store to rank search results that match the previous user search query;
returning the ranked search results that match the previous user search query for output to a corresponding user; and
capturing a metric indicating performance of the output search results.

3. The method of claim 2, wherein measuring the performance of the sets of search results comprises using each of the machine learning models in the store to rank search results for approximately equivalent numbers of received user queries.

4. The method of claim 2, wherein measuring the performance of the sets of search results comprises measuring at least one of a click-through rate, a user rating of relevancy of the search results, or implicit user feedback.

5. The method of claim 1, wherein selecting the machine learning model based on the measurements of performance comprises selecting a machine learning model from the store that has a highest probability of achieving a specified performance criterion.

6. The method of claim 1, wherein applying the scaling mechanism comprises:
measuring, by the computer system, performance of the sets of search results ranked using a first machine learning model selected from the store;

initializing, by the computer system, a parameter of a first probability distribution to the measured performed of the rankings generated using the first machine learning model; and responsive to detecting the triggering condition, applying a scaling value to the parameter of the first probability distribution to generate a second probability distribution.

7. The method of claim 1, further comprising:

receiving user feedback indicating a relevancy of the ranked search results; and storing the received user feedback as a performance metric associated with the ranked search results.

8. The method of claim 1, wherein the ranked search results include one or more products offered for sale by the online retailer that are determined to match the received search query.

9. The method of claim 1, wherein selecting the machine learning model to rank the search results for the response to the received search query comprises selecting a first machine learning model to rank the search results for the received search query and selecting a second machine learning model that is different from the first machine learning model to rank the search results for another search query.

10. A method comprising:

accessing by a computer system associated with an online retailer, a store including multiple machine learning models that are each trained to generate a ranking of search results in response to search queries received at the online retailer;

for each of a plurality of search queries input at the online retailer:
applying, by the computer system, one of the machine learning models selected from the store to generate a ranking of search results that match the received search query,
wherein each of the machine learning models in the store is used to rank search results for approximately equivalent numbers of the plurality of search queries input at the online retailer;
returning the ranked search results for output to a user who input the received search query; and
measuring a performance of the returned search results;

receiving a subsequent search query from a subsequent user of the online retailer;

responsive to receiving the subsequent search query, selecting, by the computer system, one of the machine learning models based on the measured performance of the returned search results; and providing search results ranked using the selected machine learning model for output to the subsequent user.

11. The method of claim 10, wherein measuring the performance of the returned search results comprises measuring at least one of a click-through rate, a user rating of relevancy of the search results, or implicit user feedback.

12. The method of claim 10, wherein selecting the machine learning model based on the measured performance of the returned search results comprises selecting a machine learning model from the store that has a highest probability of achieving a specified performance criterion.

13. The method of claim 10, further comprising:

detecting, by the computer system, a triggering condition for a scaling cycle;

responsive to detecting the triggering condition, applying, by the computer system, a scaling mechanism to increase an exploration of additional machine learning models selected from the store;

receiving, at the computer system, a second subsequent search query; and selecting, by the computer system, a different machine learning model from the store based on the exploration to rank search results for a response to the second subsequent search query.

14. The method of claim 13, wherein applying the scaling mechanism comprises:

measuring, by the computer system, performance of a set of search results ranked using a first machine learning model selected from the store;

initializing, by the computer system, a parameter of a first probability distribution to the measured performed of the rankings generated using the first machine learning model; and responsive to detecting the triggering condition, applying a scaling value to the parameter of the first probability distribution to generate a second probability distribution.

15. The method of claim 10, further comprising:

receiving user feedback indicating a relevancy of the search results ranked using the selected machine learning model; and storing the received user feedback as a performance metric associated with the search results ranked using the selected machine learning model.

16. The method of claim 10, wherein the ranked search results include one or more products offered for sale by the online retailer that are determined to match the received search query.

17. A system comprising:

a trained machine learning model storage comprising a non-transitory computer readable storage medium, the trained machine learning model storage storing multiple machine learning models that are each trained to generate a ranking of search results in response to search queries received at an online retailer;

a performance monitoring system including a processor configured to, for each of a plurality of search queries input at the online retailer:
apply one of the machine learning models selected from the store to generate a ranking of search results that match the received search query;
return the ranked search results for output; and
measure a performance of the returned search results;

a decision engine including a processor configured to select, for a given search query received at the online retailer, one of the machine learning models based on measured performance of previously returned search results; and a search platform including a processor configured to:
process the search queries input at the online retailer to identify sets of products that match each of the search queries;
apply for each of the processed search queries, a machine learning model selected by the decision engine to rank the identified set of products that match the processed search query; and
provide the ranked set of products for output.

* * * * *